(12) United States Patent
Priel et al.

(10) Patent No.: US 8,171,336 B2
(45) Date of Patent: May 1, 2012

(54) METHOD FOR PROTECTING A SECURED REAL TIME CLOCK MODULE AND A DEVICE HAVING PROTECTION CAPABILITIES

(75) Inventors: Michael Priel, Hertzelia (IL); Dan Kuzmin, Givat Shmuel (IL); Amir Zaltzman, Moshav Amikam (IL)

(73) Assignee: Freescale Semiconductor, Inc., Austin, TX (US)

( * ) Notice: Subject to any disclaimer, the term of this patent is extended or adjusted under 35 U.S.C. 154(b) by 890 days.

(21) Appl. No.: 12/163,610

(22) Filed: Jun. 27, 2008

(65) Prior Publication Data

US 2009/0327795 A1 Dec. 31, 2009

(51) Int. Cl.
*G06F 1/14* (2006.01)
*G06F 1/32* (2006.01)
*G06F 13/10* (2006.01)
*G06F 21/22* (2006.01)

(52) U.S. Cl. ........ 713/600; 713/182; 713/183; 713/184; 713/194; 713/300; 713/320; 713/323; 714/1; 714/2; 714/3; 326/8; 326/9

(58) Field of Classification Search .................. 713/300, 713/310, 320–324, 330, 340, 500, 600, 182–184, 713/194; 368/156, 159; 714/1–3; 326/8–9
See application file for complete search history.

(56) References Cited

U.S. PATENT DOCUMENTS

| 4,628,400 | A | * | 12/1986 | Ho ................................ 361/172 |
| 5,920,727 | A | | 7/1999 | Kikinis et al. |
| 6,069,850 | A | * | 5/2000 | Capps et al. .................. 368/156 |
| 6,772,361 | B1 | * | 8/2004 | Walsh ........................... 713/502 |
| 7,733,117 | B1 | * | 6/2010 | Priel et al. ......................... 326/8 |
| 2002/0083284 | A1 | | 6/2002 | Matusbara et al. |
| 2004/0128528 | A1 | | 7/2004 | Poisner |
| 2004/0225439 | A1 | | 11/2004 | Gronemeyer |
| 2006/0007616 | A1 | | 1/2006 | Pan et al. |
| 2006/0053314 | A1 | * | 3/2006 | Hashidate ...................... 713/300 |

FOREIGN PATENT DOCUMENTS

EP 0 150 480 B1 3/1991

* cited by examiner

*Primary Examiner* — Kim Huynh
*Assistant Examiner* — Fahmida Rahman

(57) ABSTRACT

A method for protecting a secured real time clock module, the method includes: locking multiple input ports of the secured real time clock module if the multiple input ports of the secured real time clock module are idle during at least a first duration; unlocking the multiple input ports of the secured real time clock module if a predefined high frequency code is received over a control input port of the secured real time clock module; and providing a secured real time clock signal when the multiple input ports of the secured real time clock module are locked and when the multiple input ports of the secured real time clock module are unlocked; wherein changes in a supply voltage results in a supply voltage induced changes of an input signal provided to an input port of the secured real time clock module; wherein a maximal frequency of the supply voltage induced changes of the input signal is lower than the high frequency of the predefined high frequency code.

19 Claims, 3 Drawing Sheets

METHOD FOR PROTECTING A SECURED REAL TIME CLOCK MODULE AND A DEVICE HAVING PROTECTION CAPABILITIES

FIELD OF THE INVENTION

The present invention relates to methods for protecting a secured real time clock module and for a device having protection capabilities.

BACKGROUND OF THE INVENTION

Real time clock modules have various applications. They can be used for providing timing information for operating systems, for enforcing policies for time-sensitive data, for assisting in positioning calculations and the like. U.S patent application serial number 2002/0083284 of Matsubara et al., titled "Data reproduction system, data recorder and data reader preventing fraudulent usage by monitoring reproducible time limit", U.S. Pat. No. 5,920,727 of Kikinis et al., titled "Timer-controlled computer system shutdown and startup", U.S patent application serial number 2004/0128528 of Poisner titled "Trusted real time clock" and U.S patent application serial number 2004/0225439 of Gronemeyer, titled "Method and apparatus for real time clock (RTC) brownout detection, illustrate some usages of real time clocks.

Real time clock signals can be tampered for various reasons including copyrighting piracy, concealing hacking or tampering attempts, reducing the functionality of a device and the like.

One tampering method involves repetitive alterations of the supply voltage provided to the real time clock module, in order to force the secured real time clock (SRTC) module to reset, to get stuck, to output a secured key stored in the SRTC module, to read invalid commands, and the like.

The supply voltage can be provided by a so-called "external" voltage supply unit—a voltage supply unit that is located outside an integrated circuit that includes the secured real time clock module.

Monitoring of these external voltage supply units can be power consuming and during low power modes the monitoring should be stopped.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

It has been found that an SRTC module can be protected by selectively locking its input ports and unlocking its input ports. The inputs ports are unlocked only if a predefined high frequency code is provided to a control input port of the SRTC module. Such a predefined high frequency code can not be generated by tampering the supply voltage provided to the SRTC module. The input ports are locked if they are not active during at least a first duration. This first duration is set in response to the timing of expected (valid or authorized) programming sequences of the SRCT module. Thus, during an programming sequence the input ports remain unlocked.

Figure 1:
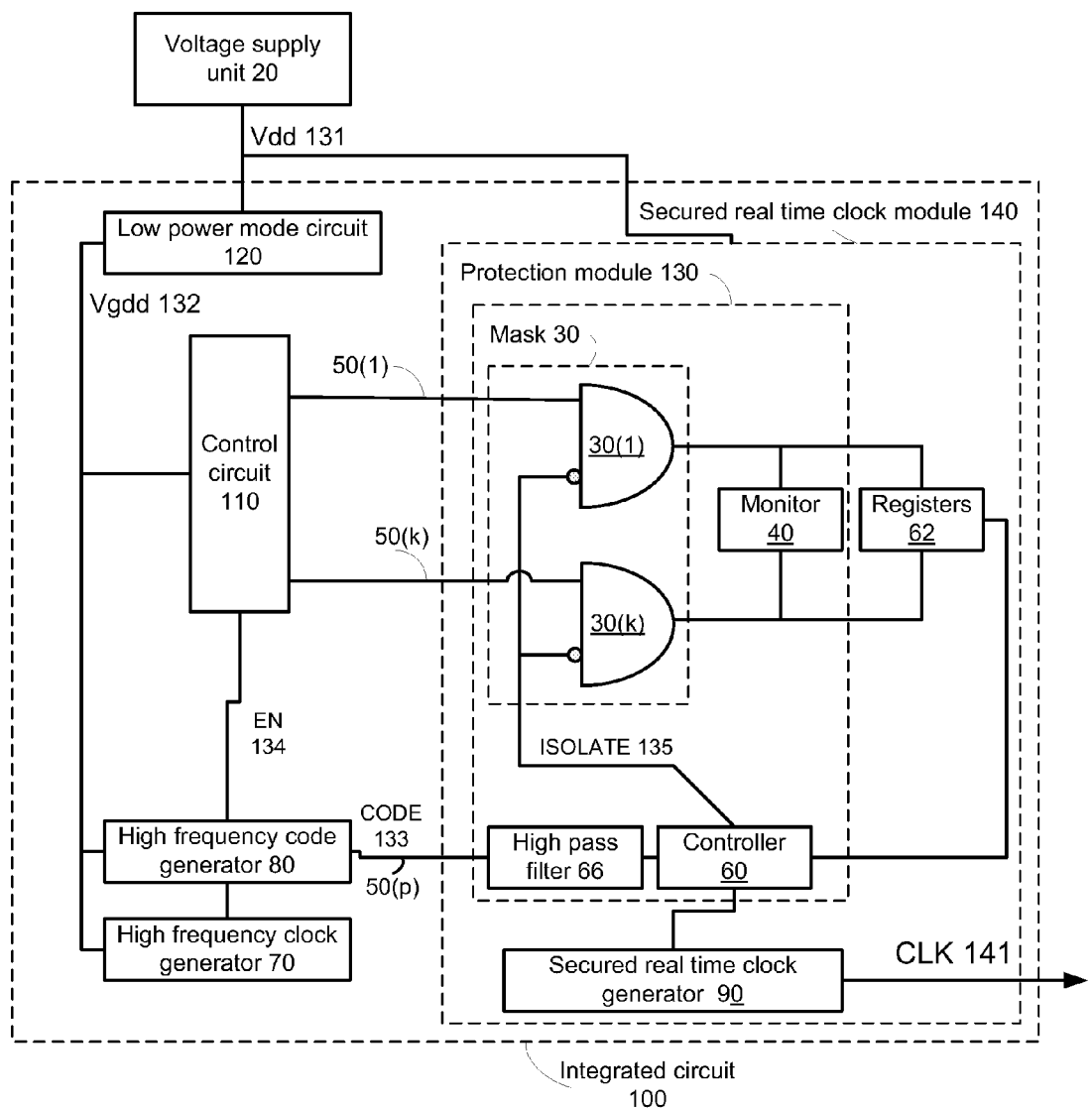
FIG. 1 schematically shows an example of an embodiment of a device that has secured real time clock (SRTC) module protection capabilities.

FIG. 1 schematically shows an example of an embodiment of device 10 that has SRTC module protection capabilities.

Device 10 can have information (data and/or media) processing capabilities. Device 10 can be a mobile device such as but not limited to laptop computer, a mobile phone, a media player, a mobile game console and the like. Device 10 can also be a stationary apparatus such as a desktop computer, a plasma screen, a television, a media entertainment system, a monitoring system, a stationary game console, a network node, a router, a switch, and the like. Device 10 can include one or more displays, processors, memory units, loudspeakers, microphones, DMA controllers, and the like. Device 10 can include multiple integrated circuits.

In the example of FIG. 1, Device 10 includes voltage supply unit 20 that is connected to integrated circuit 100.

Integrated circuit 100 includes low power mode circuit 120, control module 110, high frequency code generator 80, high frequency clock generator 70, and SRTC module 140. SRTC module 140 includes multiple inputs, such as inputs 50(1)-50(k), control input 50(p), protection module 130, monitor 40, a control circuit, registers 62, high pass filter 66, controller 60 and SRTC generator 90.

Voltage supply unit 20 provides supply voltage Vdd 131 to integrated circuit 100. This supply voltage is sent to various components of integrated circuit 100, including but not limited to low power mode circuit 120 and SRTC module 140. Low power mode circuit 120 can apply power saving techniques that involve shutting down various components of integrated circuit 100 during low power periods. Low power mode circuit 120 provides a gated supply voltage Vgdd 132 to control module 110, high frequency code generator 80 and high frequency clock generator 70. Vgdd 132 is not provided during low-power periods.

Vdd 131 and even Vgdd 132 can fluctuate or otherwise change. A change in a level of Vdd 131 or Vgdd 132 can cause supply voltage induced changes of input signals provides to one or more inputs ports 50(1)-50(k) of SRTC module 140. These changes should be filtered out.

High frequency code generator 80 is connected to high frequency clock generator 70, control module 110 and control input 50(p) of SRTC module 140. It generates a predefined high frequency code (denoted CODE 133) and sends it to control input 50(p) while it receives an enabling signal (denoted EN 134) from control module 110 and while it receives a high frequency clock signal (for example a 20-30 Mega Hertz clock signal) from high frequency clock generator 70. Once the provision of enabling signal EN 134 stops the high frequency code generator 80 stops generating the predefined high frequency code, even if it was in the middle of generating such a code.

During low power periods control module 110, high frequency code generator 80, and high frequency clock generator 70 are disabled and the predefined high frequency code can not be sent to SRTC module 140.

The predefined high frequency code is used to unlock inputs 50(1)-50(k) of SRTC module 140. It has a frequency that is higher than the maximal frequency of supply voltage induced changes of an input signal that is provided to control input 50(p). The high frequency can be few tens of megahertz while the maximal frequency of supply voltage induced changes is below one megahertz. The maximal frequency of the supply voltage induced changes is limited by the maximal frequency of voltage supply level changes. These changes are bounded by the relatively large capacitance of the voltage supply grid.

SRTC module 140 includes high pass filter 66 that is connected between control input port 50(p) and controller 60. High pass filter 66 filters out supply voltage induced changes of an input signal that is provided to control input port 50(p) and passes the high frequency predefined code.

Control module 110 controls integrated circuit 100 or at least some portions of integrated circuit 100. It is shut down during low power periods. It can determine when SRTC module 140 should be unlocked and send enabling signal EN 134 to high frequency code generator 80. It can also write information (such as bit not limited to commands) to inputs 50(1)-50(k) of SRTC module 140.

Input ports 50(1)-50(k) of SRTC module 140 are connected to mask 30. Mask 30 is also connected to controller 60, to monitor 40 and to registers 62.

Controller 60 determines whether mask 60 should mask input signals that are receives over inputs 50(1)-50(k) or to unmask these input signals. Inputs ports 50(1)-50(k) are locked or isolated when mask 30 masks these input signals. Input ports 50(1)-50(k) are unlocked when mask 30 is transparent and unmasks these input signals.

Controller 60 also controls SRTC generator 90 in response to control information. The control information can be provided over input ports 50(1)-50(k) and can then be stored in registers 62. The control of SRTC generator 90 can involve determining the frequency of the SRTC signal CLK 141, halting SRTC generator 90, renewing the operation of SRTC generator 90 and the like.

SRTC module 140 can be programmed, by programming sequences. These programming sequences do not occur during low power periods. A programming sequence can include multiple commands that are spaced apart in time. The timing associated with a programming sequence (for example the timing gap between one command to another), are known in advance or can be estimated with a reasonable accuracy. SRTC module 140 should remain unlocked during the programming sequence, but should be locked during other periods. This can be guaranteed by determining a first duration (that is responsive to timing of a programming sequence) and locking SRTC module 140 if input ports 50(1)-50(k) are idle during at least that first duration.

The first duration is shorter and even much shorter than the duration of a typical low power period. For example, the first duration can be shorter than few percents (for example shorter than 5%) of a low power period. A low power period can exceed one hundred milliseconds and can be much longer while the first duration can be few milliseconds.

Monitor 40 is connected to the output ports of mask 30. When mask 30 is transparent the activity of the output ports of mask 30 reflects the activity of input ports 50(1)-50(k). When mask 30 masks the input signals (when the input ports are locked) monitor 40 does not sense any activity. Accordingly, monitor 40 ignores supply voltage induced changes of input signals introduced when SRTC module 140 is locked.

Controller 60 is also adapted to unlock input ports 50(1)-50(k) by instructing mask 30 to be transparent if, after these input ports are locked, a predefined high frequency code is received over control input port 50(p) of SRTC module 140. This high frequency code is high pass filtered by high pass filter 66.

Mask 30 is controlled by controller 60. It masks input signals when SRTC module 140 is locked and is transparent when SRTC module 140 is unlocked. Mask 30 can include various circuits such as bit not limited to AND gates, OR gates, XOR gates, and the like.

The type of logic gates of mask 30 are designed according to the level of an isolation signal (denoted ISOLATE 135) that should cause an isolation of input ports 50(1)-50(k). For example, if a high level (or "1") isolation signal 135 should trigger the masking then the logic gates can be a combination of inverters and AND gates. In such a case the logic gate can be a NAND gate and the input signal can be passed through an inverter. In the example of FIG. 1 mask 30 includes logic gates 30(1) and 30(k) that are AND gates, each AND gate includes an inverting input port that receives isolation signal 135 such that when isolation signal is "high" mask 30 masks the input signals.

Figure 2:
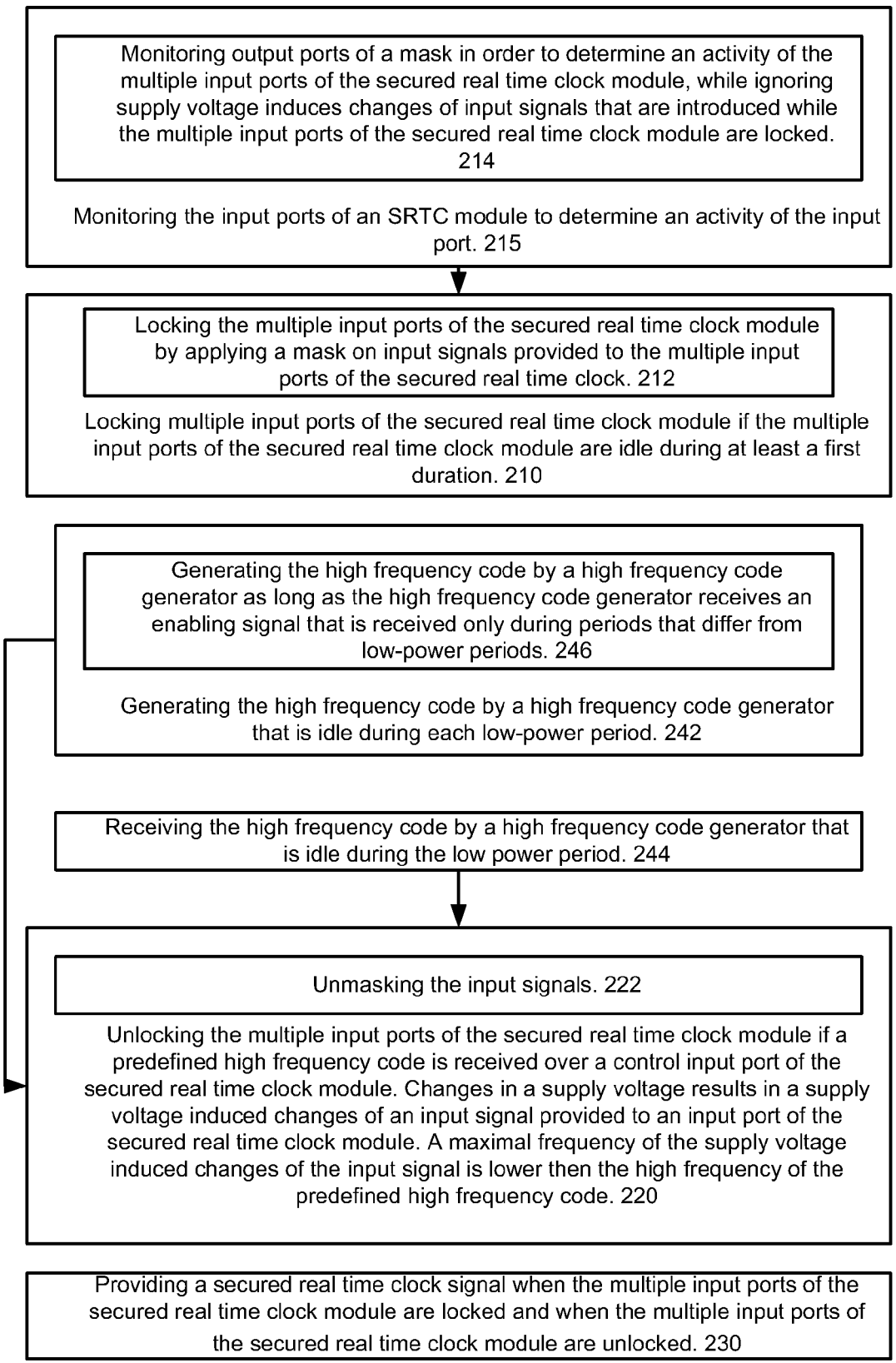
FIG. 2 schematically shows an example of an embodiment of a method for protecting a SRTC module.

FIG. 2 schematically shows an example of an embodiment of method 200 for protecting a SRTC module.

Method 200 starts by stages 214 and 230.

Stage 214 includes monitoring the input ports of an SRTC module to determine an activity of the input port. An input port is deemed active during a period that it received input signals that change over time.

Stage 214 conveniently includes stage 215 of monitoring output ports of a mask that is connected to the input ports of the SRTC module, in order to determine an activity of the multiple input ports of the SRTC module. Stage 215 can include ignoring supply voltage induces changes of input signals that are introduced while the multiple input ports of the SRTC module are locked. The mask is used to selectively lock the input ports of the SRTC module.

Stage 214 is followed by stage 210 of locking multiple input ports of the SRTC module if the multiple input ports of the SRTC module are idle during at least a first duration. Stage 210 can also include stage 212 of locking the multiple input ports of the SRTC module by applying a mask on input signals provided to the multiple input ports of the SRTC.

Method 200 also includes either one of stages 242 and 244. Stages 242 and 244 can follow stage 210. Stage 220 can be followed by stage 214.

Stage 242 includes generating the high frequency code by a high frequency code generator that is idle during each low-power period. Conveniently, the multiple input ports of the SRTC module are idle during at least one low-power period, each low-power period being longer than the first duration. Stage 242 can also include stage 246 of generating the high frequency code by a high frequency code generator as long as the high frequency code generator receives an enabling signal that is received only during periods that differ from low-power periods.

Stage 244 includes receiving the high frequency code by a high frequency code generator that is idle during the low power period. Conveniently, the multiple input ports of the SRTC module are idle during at least one low-power period, each low-power period being substantially longer than the first duration.

Stage 244 can include generating the high frequency code by a high frequency code generator as long as the high frequency code generator receives an enabling signal that is received only during periods that differ from low-power periods.

Stages 242 and 244 are followed by stage 220 of unlocking the multiple input ports of the SRTC module if a predefined high frequency code is received over a control input port of the SRTC module. Changes in a supply voltage results in a supply voltage induced changes of an input signal provided to an input port of the SRTC module. A maximal frequency of the supply voltage induced changes of the input signal is lower than the high frequency of the predefined high frequency code.

Stage 220 can include stage 222 of unmasking the input signals provided to the input ports of the SRTC module. Stage 222 can also include of high pass filtering signals sent over the control input port so as to filter out supply voltage induced changes.

Stage 230 includes providing an SRTC signal when the multiple input ports of the SRTC module are locked and when the multiple input ports of the SRTC module are unlocked.

Figure 3:
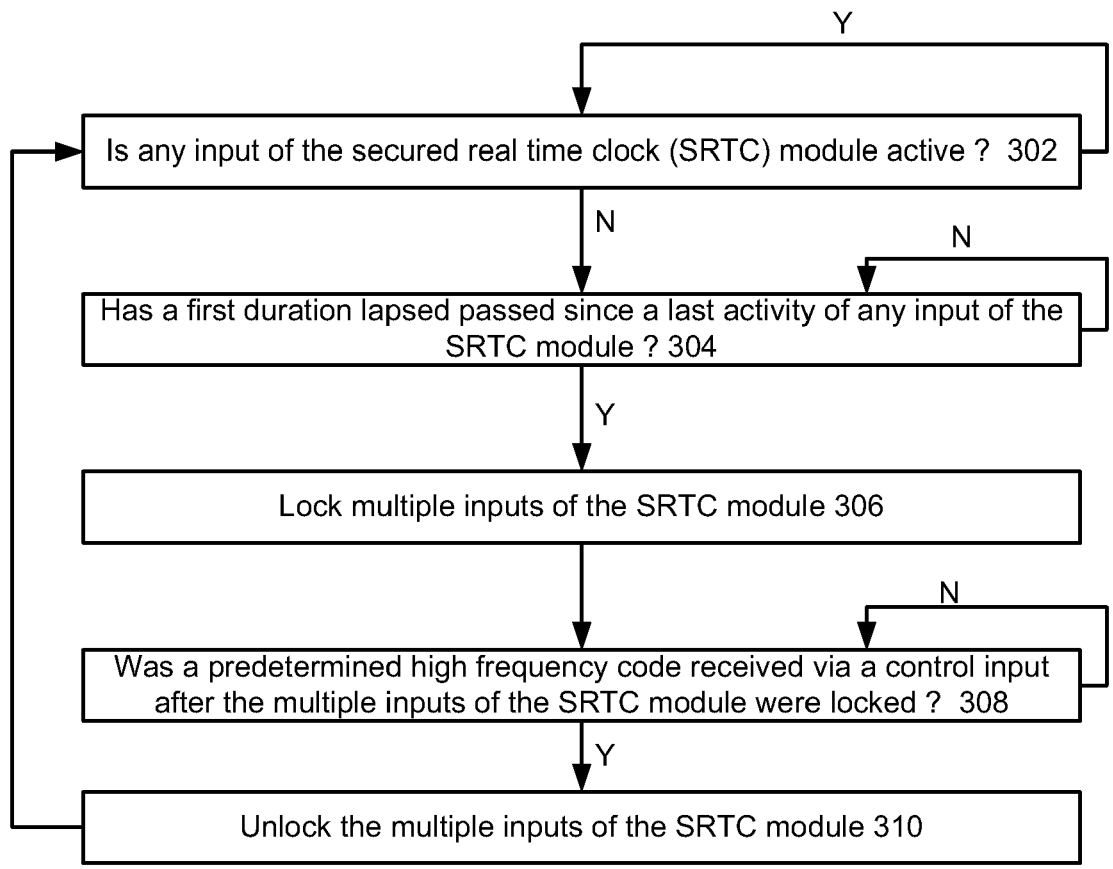
FIG. 3 schematically shows an example of an embodiment of a method for protecting a SRTC module.

FIG. 3 schematically shows an example of an embodiment of method 300 for protecting a SRTC module.

Referring to the example of FIG. 1, method 300 is executed by protection module 130.

Method 300 starts by stage 302 of checking is any input port of the SRTC module is active. This stage is repeated until no input port of the SRTC module is active. Once the answer is negative stage 302 is followed by stage 304 of checking whether a first duration has lapsed since the last activity on one or more (or even all) input ports of the SRTC module. If the answer is negative stage 304 is followed by stage 302, else it is followed by stage 306 of locking multiple input ports of the SRTC module.

Stage 306 is followed by stage 308 of checking if a predefined high frequency code was received via a control input port of the SRTC module (after the multiple input ports of the SRTC module were locked). Stage 308 is repeated until receiving a positive answer and then it is followed by stage 310 of unlocking the multiple input ports of the SRTC module. Stage 310 is followed by stage 302.

Although the invention has been described with respect to specific conductivity types or polarity of potentials, skilled artisans appreciated that conductivity types and polarities of potentials may be reversed.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, However, other modifications, variations, and alternatives are also possible. The specifications and drawings are, accordingly, to be regarded in an illustrative rather than in a restrictive sense.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for protecting a secured real time clock module, the method comprises:
    locking multiple input ports of the secured real time clock module if the multiple input ports of the secured real time clock module are idle during at least a first duration;
    unlocking the multiple input ports of the secured real time clock module if a predefined high frequency code is received over a control input port of the secured real time clock module; and
    providing a secured real time clock signal when the multiple input ports of the secured real time clock module are locked and when the multiple input ports of the secured real time clock module are unlocked;
    wherein changes in a supply voltage results in a supply voltage induced changes of an input signal provided to an input port of the multiple input ports of the secured real time clock module;
    wherein a maximal frequency of the supply voltage induced changes of the input signal is lower than a high frequency of the predefined high frequency code.

2. The method according to claim 1 wherein the multiple input ports of the secured real time clock module are idle during at least one low-power period, each low-power period of the at least one low-power period being longer than the first duration;
    wherein the method comprises generating the predefined high frequency code by a high frequency code generator that is idle during the each low-power period of the at least one low-power period.

3. The method according to claim 1 wherein the multiple input ports of the secured real time clock module are idle during at least one low-power period, the each low-power period of the at least one low-power period being longer than the first duration;

wherein the method comprises receiving the predefined high frequency code by a high frequency code generator that is idle during the at least one low-power period.

4. The method according to claim 1 comprising generating the predefined high frequency code by a high frequency code generator as long as the high frequency code generator receives an enabling signal that is received only during periods that differ from low-power periods.

5. The method according to claim 1 comprising locking the multiple input ports of the secured real time clock module by applying a mask on input signals provided to the multiple input ports of the secured real time clock module; and wherein the unlocking comprises unmasking the input signals.

6. The method according to claim 1 comprising:

locking the multiple input ports of the secured real time clock module by masking multiple input signals; and monitoring output ports of a mask in order to determine an activity of the multiple input ports of the secured real time clock module, while ignoring supply voltage induced changes of input signals that are introduced while the multiple input ports of the secured real time clock module are locked.

7. The method according to claim 1 comprising high pass filtering signals sent over the control input port so as to filter out the supply voltage induced changes.

8. A device having secured real time clock module protection capabilities, the device comprises a secured real time clock module; the secured real time clock module comprises:

a controller, coupled to a real time clock generator, adapted to control the real time clock generator in response to control information;

a protection module, coupled to the controller and to multiple input ports of the secured real time clock module, the protection module locks the multiple input ports of the secured real time clock module if the multiple input ports of the secured real time clock module are idle during at least a first duration; and unlock the multiple input ports of the secured real time clock module if a predefined high frequency code is received over a control input port of the secured real time clock module; and the real time clock generator, adapted to generate a real time clock signal when the multiple input ports of the secured real time clock module are locked and when the multiple input ports of the secured real time clock module are unlocked;

wherein changes in a supply voltage results in a supply voltage induced changes of an input signal provided to an input port of the multiple input ports of the secured real time clock module;

wherein a maximal frequency of the supply voltage induced changes of the input signal is lower than a high frequency of the predefined high frequency code.

9. The device according to claim 8 wherein the multiple input ports of the secured real time clock module are idle during at least one low-power period, each low-power period of the at least one low-power period being longer than the first duration;

wherein the device further comprises a high frequency code generator that is idle during the each low-power period of the at least one low-power period and is adapted to generate the high frequency code.

10. The device according to claim 9 wherein high frequency code generator generates the high frequency code while it receives an enabling signal; wherein the enabling signal is received only during periods that differ from low-power periods.

11. The device according to claim 8 wherein the protection module comprises a mask; wherein the mask is adapted to mask input signals provided to the multiple input ports of the secured real time clock module; and wherein the mask is adapted to unlock the multiple input ports of the secured real time clock module by unmasking the input signals to the secured real time clock module.

12. The device according to claim 11 comprising a monitor, coupled to output ports of the mask, adapted to monitor the output ports of the mask in order to determine an activity of the multiple input ports of the secured real time clock module, while ignoring supply voltage induced changes of input signals that are introduced while the multiple input ports of the secured real time clock module are locked.

13. The device according to claim 8 comprising a high pass filter adapted to apply a high pass filter operation on signals sent over the control input port so as to filter out the supply voltage induced changes.

14. A method for protecting a secured real time clock module, the method comprises:

locking multiple input ports of the secured real time clock module if the multiple input ports of the secured real time clock module are idle during at least a first duration;

generating a predefined high frequency code by a high frequency code generator as long as the high frequency code generator receives an enabling signal that is received only during periods that differ from low-power periods; and unlocking the multiple input ports of the secured real time clock module if the predefined high frequency code is received over a control input port of the secured real time clock module;

wherein a maximal frequency of a supply voltage induced changes of an input signal to the secured real time clock module is lower than a high frequency of the predefined high frequency code.

15. The method according to claim 14 comprising locking the multiple input ports of the secured real time clock module by applying a mask on input signals provided to the multiple input ports of the secured real time clock module; and wherein the unlocking comprises unmasking the input signals.

16. The method according to claim 14 comprising high pass filtering signals sent over the control input port so as to filter out the supply voltage induced changes.

17. A method for protecting a secured real time clock module, the method comprising:

locking multiple input ports of the secured real time clock module if the multiple input ports of the secured real time clock module are idle during at least a first duration, wherein the multiple input ports of the secured real time clock module are idle during at least one low-power period, each low-power period of the at least one low-power period being longer than the first duration;

generating a predefined high frequency code by a high frequency code generator that is idle during the each low-power period of the at least one low-power period; and unlocking the multiple input ports of the secured real time clock module if the predefined high frequency code is received over a control input port of the secured real time clock module;

wherein a maximal frequency of a supply voltage induced changes of an input signal to the secured real time clock module is lower than a high frequency of the predefined high frequency code.

18. A method for protecting a secured real time clock module, the method comprising:

locking multiple input ports of the secured real time clock module if the multiple input ports of the secured real time clock module are idle during at least a first duration, wherein the multiple input ports of the secured real time clock module are idle during at least one low-power period, the each low-power period of the at least one low-power period being longer than the first duration;

receiving a predefined high frequency code by a high frequency code generator that is idle during the at least one low-power period; and unlocking the multiple input ports of the secured real time clock module if the predefined high frequency code is received over a control input port of the secured real time clock module;

wherein a maximal frequency of a supply voltage induced changes of an input signal to the secured real time clock module is lower than a high frequency of the predefined high frequency code.

19. A method for protecting a secured real time clock module, the method comprising:

locking multiple input ports of the secured real time clock module if the multiple input ports of the secured real time clock module are idle during at least a first duration;

unlocking the multiple input ports of the secured real time clock module if a predefined high frequency code is received over a control input port of the secured real time clock module;

wherein a maximal frequency of a supply voltage induced changes of an input signal to the secured real time clock module is lower than a high frequency of the predefined high frequency code;

locking the multiple input ports of the secured real time clock module by masking multiple input signals; and monitoring output ports of a mask in order to determine an activity of the multiple input ports of the secured real time clock module, while ignoring supply voltage induced changes of input signals that are introduced while the multiple input ports of the secured real time clock module are locked.

* * * * *